(12) United States Patent
Vendrow et al.

(10) Patent No.: US 10,749,833 B2
(45) Date of Patent: Aug. 18, 2020

(54) MESSAGING SYSTEM HAVING SEND-RECOMMENDATION FUNCTIONALITY

(71) Applicant: RingCentral, Inc., Belmont, CA (US)

(72) Inventors: Vlad Vendrow, Redwood City, CA (US); Christopher Van Rensburg, Foster City, CA (US); Martin Arastafar, Redwood City, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 15/204,745

(22) Filed: Jul. 7, 2016

(65) Prior Publication Data

US 2018/0013698 A1    Jan. 11, 2018

(51) Int. Cl.
| | |
|---|---|
| *H04L 12/58* | (2006.01) |
| *G06F 3/01* | (2006.01) |
| *H04L 29/08* | (2006.01) |
| *G06Q 10/10* | (2012.01) |
| *G06F 16/9535* | (2019.01) |
| *H04M 1/725* | (2006.01) |
| *G06N 20/00* | (2019.01) |

(52) U.S. Cl.
CPC ............. *H04L 51/24* (2013.01); *G06F 3/015* (2013.01); *G06F 16/9535* (2019.01); *G06Q 10/107* (2013.01); *H04L 51/14* (2013.01); *H04L 51/26* (2013.01); *H04L 67/327* (2013.01); *H04M 1/72552* (2013.01); *G06F 2203/011* (2013.01); *G06N 20/00* (2019.01)

(58) Field of Classification Search
CPC ....... H04L 51/02; H04L 51/27; H04L 67/327; G06F 3/015; G06F 2203/011

USPC .......................................................... 709/204
See application file for complete search history.

(56) References Cited

U.S. PATENT DOCUMENTS

| | | | | |
|---|---|---|---|---|
| 6,901,398 | B1 * | 5/2005 | Horvitz ................ | G06Q 10/107 707/694 |
| 7,007,067 | B1 * | 2/2006 | Azvine .................. | G06F 3/011 709/202 |
| 7,409,423 | B2 * | 8/2008 | Horvitz ................ | G06Q 10/109 706/21 |
| 8,086,672 | B2 | 12/2011 | Horvitz | |
| 8,619,616 | B2 * | 12/2013 | Balasubramanian ....................... | H04L 41/5025 370/252 |
| 8,874,671 | B2 * | 10/2014 | Pasquero ............. | G06Q 10/107 709/203 |
| 2002/0087649 | A1 * | 7/2002 | Horvitz ................ | G06Q 10/107 709/207 |
| 2004/0199663 | A1 * | 10/2004 | Horvitz ................ | G05B 19/404 709/238 |
| 2007/0061735 | A1 * | 3/2007 | Hoffberg ............... | G06F 9/4443 715/744 |

(Continued)

*Primary Examiner* — Michael Won
(74) *Attorney, Agent, or Firm* — Finnegan, Henderson, Farabow, Garrett & Dunner, LLP

(57) ABSTRACT

A method is provided for determining when to send an electronic message. The method may include receiving the electronic message for a recipient, and making a prediction associated with the electronic message being positively received by the recipient based on an attribute of the electronic message and an additional attribute of the recipient. The method may also include selectively sending or deferring sending of the electronic message based on the prediction.

13 Claims, 6 Drawing Sheets

(56) References Cited

U.S. PATENT DOCUMENTS

| | | | |
|---|---|---|---|
| 2007/0133446 A1* | 6/2007 | Yoon | H04L 1/0026 370/310 |
| 2007/0226309 A1* | 9/2007 | Bell, III | H04L 51/04 709/206 |
| 2008/0004793 A1* | 1/2008 | Horvitz | G08G 1/01 701/487 |
| 2008/0160968 A1* | 7/2008 | Singh | H04M 3/42374 455/414.1 |
| 2009/0061925 A1* | 3/2009 | Finkelstein | H04M 1/72522 455/552.1 |
| 2009/0063637 A1* | 3/2009 | Sun | H04L 12/1831 709/206 |
| 2012/0124431 A1* | 5/2012 | Bauer | H04L 41/0663 714/55 |
| 2012/0143798 A1* | 6/2012 | Sundelin | G06Q 10/107 706/12 |
| 2013/0006403 A1* | 1/2013 | Moore | G06Q 10/101 700/92 |
| 2013/0064163 A1* | 3/2013 | Fettweis | H04L 1/1854 370/312 |
| 2013/0159408 A1* | 6/2013 | Winn | G06N 99/005 709/204 |
| 2013/0212185 A1* | 8/2013 | Pasquero | G06Q 10/10 709/206 |
| 2013/0214925 A1* | 8/2013 | Weiss | G08B 25/001 340/539.11 |
| 2014/0066025 A1* | 3/2014 | Maria | H04L 51/066 455/413 |
| 2014/0194151 A1* | 7/2014 | Bengtsson | H04L 51/04 455/466 |
| 2014/0280659 A1* | 9/2014 | Siram | H04L 51/066 709/207 |
| 2014/0328191 A1* | 11/2014 | Barriac | H04L 51/066 370/252 |
| 2014/0328194 A1* | 11/2014 | Sen | H04W 72/082 370/252 |
| 2015/0081790 A1* | 3/2015 | Ogawa | G06F 17/30595 709/204 |
| 2015/0089007 A1* | 3/2015 | Amoroso | G06Q 10/107 709/206 |
| 2015/0312197 A1* | 10/2015 | Dong | H04L 51/28 715/752 |
| 2015/0372961 A1 | 12/2015 | Phung et al. | |
| 2015/0381534 A1* | 12/2015 | Morris | H04L 51/046 715/752 |
| 2016/0127641 A1* | 5/2016 | Gove | G06T 1/0007 348/143 |
| 2018/0176331 A1* | 6/2018 | Jain | H04L 67/327 |

* cited by examiner

|                  | Y | N | N/A |
|------------------|---|---|-----|
| BUSINESS RELATED | ✓ | ○ | ○ |
| URGENT           | ○ | ✓ | ○ |
| CRITICAL         | ○ | ✓ | ○ |
| GOOD NEWS        | ✓ | ○ | ○ |

| | |
|---|---|
| SEND NOW | ✓ |
| SAVE FOR LATER | ○ |
| AUTO-SEND AT OPTIMAL TIME | ○ |
| RECOMMEND WHEN TO SEND | ○ |

|                  | Y | N | N/A |
|------------------|---|---|-----|
| POSITIVE OUTCOME | ✓ | ○ | ○ |
| TIMING EARLY     | ○ | ✓ | ○ |
| TIMING LATE      | ○ | ✓ | ○ |

MESSAGING SYSTEM HAVING SEND-RECOMMENDATION FUNCTIONALITY

TECHNICAL FIELD

The present disclosure generally relates to a messaging system and, more particularly, to a messaging system having send-recommendation functionality.

BACKGROUND

Electronic messages, such as texts (e.g., SMS and MMS), emails, and chat messages, have become popular, often replacing live voice conversations between individuals. These electronic messages are sometimes used when a prompt response is needed, even though the sender usually does not know whether the recipient is presently monitoring his or her electronic messaging device or when the recipient will read the message. Some electronic messaging systems indicate whether system users are idle or unavailable based on a predetermined length of inactivity on the messaging device, a status manually set by the user, or the recipient's schedule.

In some situations, electronic message senders desire to know whether recipients are not only present, but also if the recipient will be receptive to the message. For example, some messages have a greater importance than other messages and, if the message were to be received at an inopportune time (e.g., when the recipient does not have time to properly ponder the message, when the recipient has a temperament that is not conducive to receiving the message, when the recipient is occupied with other more important concerns, etc.), a likelihood of achieving an intended purpose with the message may go down. One drawback of current electronic messaging systems is that the sender may not have an indication of the recipient's receptiveness for a given message.

SUMMARY

Consistent with a disclosed embodiment, a method is provided for recommending when to send an electronic message. The method may include receiving the electronic message for a recipient, and making a prediction associated with the electronic message being positively or favorably received by the recipient (for example, actually read and responded to in a manner desired by the recipient) based on an attribute of the electronic message and an additional attribute of the recipient. The method may also include selectively sending or deferring sending of the electronic message based on the prediction.

Consistent with another disclosed embodiment, a system for determining when to send an electronic message is provided. The system may include a memory having stored thereon computer-executable instructions, and one or more processors configured to execute the stored instructions. The one or more processors may be configured to receive an electronic message from a recipient, to calculate a receptiveness indicator based on an attribute of the electronic message and an additional attribute of a recipient in association with the electronic message being positively or favorably received by the recipient, and to display the receptiveness indicator to the sender. The one or more processors may also be configured to receive a control instruction from the sender to send or defer sending of the electronic message, and to selectively send, save, auto-send, or recommend sending of the electronic message based on the control instruction. The attribute of the electronic message may include at least one of: a content, a context, a topic, a genre, an urgency, and a temperament. The additional attribute of the recipient may include at least one of a schedule, a temperament, a message-related history, and a relationship with the sender.

Consistent with other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings:

FIGS. 5-8 illustrate example interfaces associated with the system of FIG. 1, in accordance with the disclosed embodiments.

DETAILED DESCRIPTION

The disclosed embodiments concern a process of determining when an electronic message should be sent to a particular recipient based, at least in part, on an attribute of the electronic message (e.g., the content of the electronic message, the context of the electronic message, an urgency of the electronic message, etc.) and/or an attribute of the recipient (e.g., a schedule of the recipient, a measured biometric of the recipient, a message-related history of the recipient, a relationship of the recipient with the sender, etc.). In one embodiment, a server analyzes the attributes of the electronic message and the recipient. In another embodiment, the server receives input from a sender regarding one or more of the different attributes. The server recommends sending of the electronic message at a time when the attributes of the recipient indicate an acceptable reception by the recipient of the attributes of the electronic message.

For purposes of explanation, the method steps are described herein as being performed by a server. However, in some embodiments, the method steps may be performed by a sender's electronic messaging device, a recipient's electronic messaging device, or a combination of the messaging devices and the server in a static or dynamic distributed operation.

Other features and advantages of the present embodiments are discussed in further detail below with respect to the figures.

Figure 1:
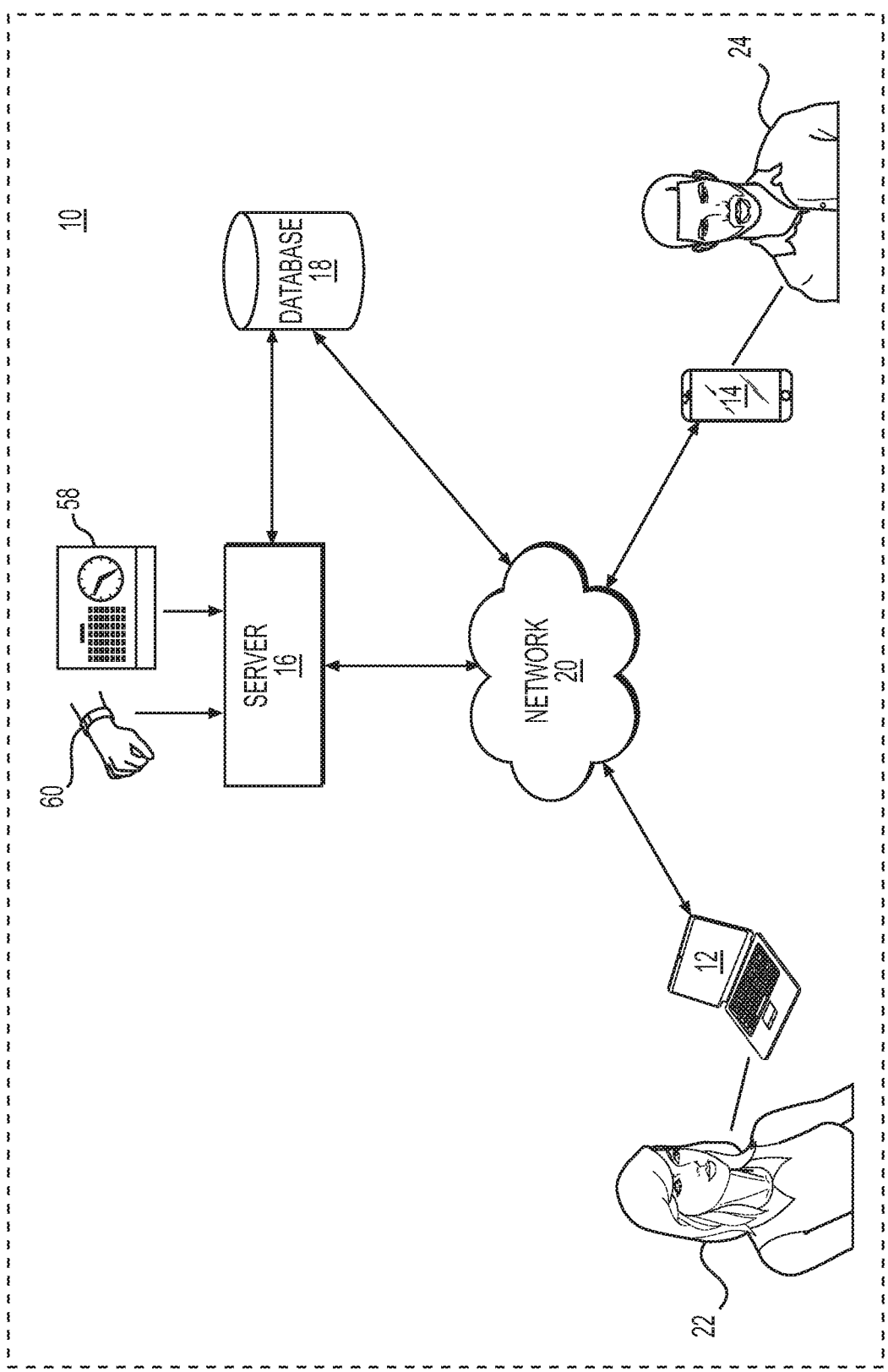
FIG. 1 is a diagram of an example system for providing a send recommendation in association with an electronic message, consistent with the disclosed embodiments.

FIG. 1 is a diagram of a system 10 for determining and recommending to a particular sender an opportune time to send a particular electronic message to a particular recipient, consistent with disclosed embodiments. As shown in FIG. 1, system 10 may include a sender device 12, a recipient device 14, a server 16, a database 18, and a network 20 connecting each of the other devices. A sender 22 operates sender device 12, while a recipient 24 operates recipient device 14. The components and arrangements shown in FIG. 1 are not intended to limit the disclosed embodiments, as the system components used to implement the disclosed processes and features can vary.

Sender and recipient devices 12, 14 may each be a computerized device having data entry, data transmission, and data display capabilities. In some embodiments, one or more of sender and recipient devices 12, 14 are mobile devices with computing abilities (e.g., smart phones or tablets), Personal Digital Assistants (PDAs), general purpose or notebook computers, or any combination of these and other affiliated components. It is contemplated that sender and recipient devices 12, 14 may be the same types of devices or different.

Figure 2:
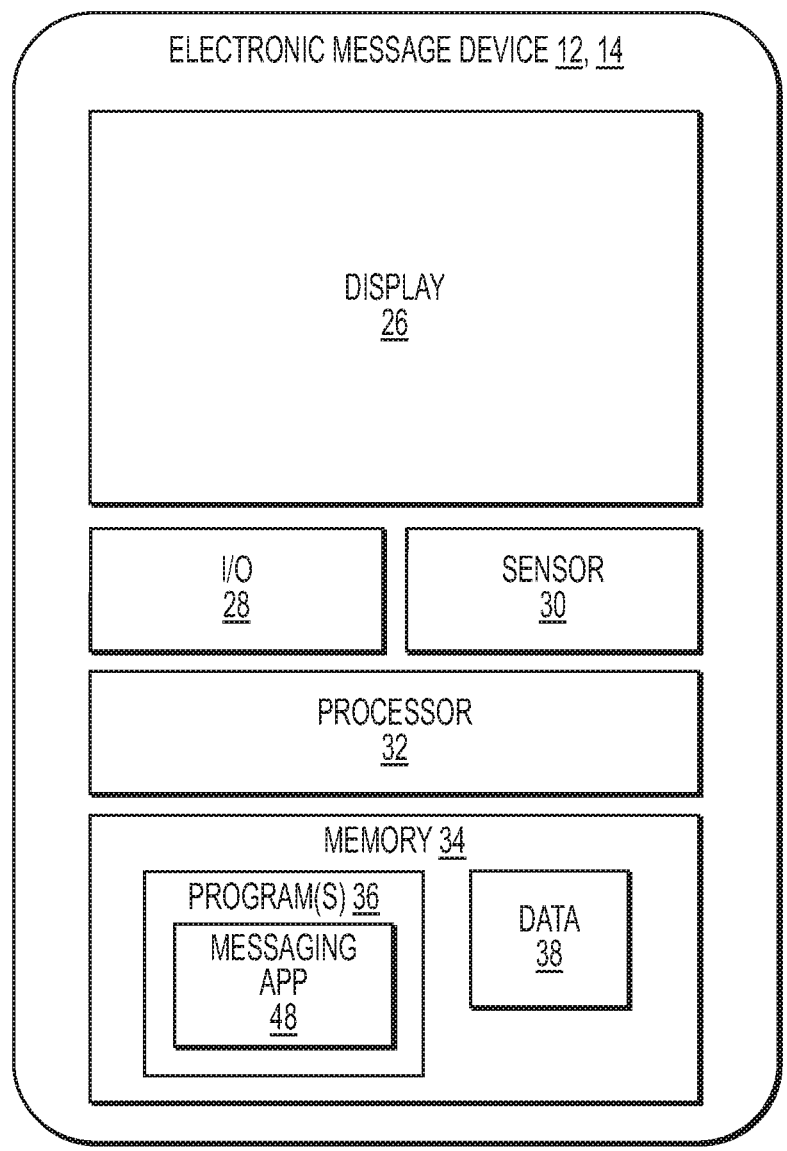
FIG. 2 is a component diagram of an example server, consistent with the disclosed embodiments.

As shown in the example component diagram of FIG. 2, sender device 12 may include a display 26, any number of input/output ("I/O") devices 28, one or more sensors 30, one or more single- or multi-core processors 32, and a memory 34 having stored thereon one or more programs 36 and data 38. It should be noted that recipient device 14 may have the same or a different component configuration.

Display 26 may include a liquid crystal display (LCD), a light emitting diode (LED) screen, an organic light emitting diode (OLED) screen, and/or another known display device. Display 26 may be used for the rendering of graphics and/or text, under the control of processor 32.

I/O devices 28 may be configured to send and receive information. I/O devices 28 may include, for example, keyboards, mouse devices, buttons, switches, and/or a touchscreen panel (e.g., a panel integrated with display 26). I/O devices 28 may also include one or more communication modules (not shown) for sending information to and receiving information from other components of system 10 by, for example, establishing wired or wireless connectivity between sender device 12 and network 20 (referring to FIG. 1), server 16, and/or recipient device 14. Direct connections may include, for example, Bluetooth™, Bluetooth LE™, WiFi, near field communications (NFC), or other known communication methods that provide a medium for transmitting data between separate devices.

Sensor 30 may represent one or more sensors configured to collect data about sender device 12, about sender 22, and/or about the environment surrounding sender device 12. For example, sensor 30 may be a Global Positioning System (GPS) sensor, an ambient light sensor, an orientation sensor, an accelerometer, an altitude sensor, a biometric sensor (e.g., a fingerprint sensor, a facial recognition camera, a pulse rate sensor, a blood pressure sensor, a perspiration sensor, a body thermometer, etc.), and/or another sensor known in the art.

Processor 32 may be configured with virtual processing technologies, and use logic to simultaneously execute and control any number of operations. Processor 32 may be configured to implement virtual machine or other known technologies to execute, control, run, manipulate, and store any number of software modules, applications, programs, etc.

Memory 34 may include a volatile or non-volatile, magnetic, semiconductor, tape, optical, removable, non-removable, or other type of storage device or tangible and/or non-transitory computer-readable medium that stores one or more executable programs 36, such as a messaging app 42, and data 38. Data 38 can include, for example, information that is personal to sender 22, account information, settings, and preferences.

In some embodiments, programs 36 include operating systems (not shown) that perform known functions when executed by processor 32. By way of example, the operating systems may include Microsoft Windows™, Unix™, Linux™, Apple™ operating systems, Android™ operating systems, Personal Digital Assistant (PDA) type operating systems, such as Microsoft CE™, or other types of operating systems. Sender device 12 may also include communication software that, when executed by processor 32, provides communications with network 20 (referring to FIG. 1), such as Web browser software, tablet, or smart handheld device networking software, etc.

Messaging app 42 may include, among other things, an email client, an instant electronic message app, and/or a Short Messaging Service (SMS) app, which, when executed, causes sender device 12 to perform processes related to generating and transmitting an electronic message from sender 22 to recipient 24. For example, messaging app 42 may be able to configure sender device 12 to perform operations including: generating and displaying a user interface for creating and sending an electronic message; receiving input from sender 22 via I/O devices 28, and processing the received input to create the electronic message; sending the electronic message; receiving an indicator of recipient receptiveness for the electronic message; and displaying the receptiveness indicator. In some embodiments, messaging app 42 can also configure sender device 12 to determine an attribute of the electronic message and/or an attribute of sender 22 or recipient 24. In some embodiments, messaging app 42 can configure recipient device 14 to perform operations including: generating and displaying a user interface responsive to a received electronic message; monitoring and providing activity, biometric, and environmental data to server 16 (referring to FIG. 1); receiving input associated with a response to the electronic message; and transmitting the response. In some embodiments, messaging app 42 can also configure recipient device 14 to analyze monitored activity, biometric activity, and environmental data to determine the receptiveness of recipient 24, and to provide the receptiveness indicator to server 16 and/or sender device 12.

Server 16 (referring to FIG. 1) may be a single server or a distributed system of multiple servers that cooperate to perform one or more of the processes and functionalities associated with the disclosed embodiments. For example, server 16 can include one or more desktop computers, workstations, handheld computing devices (smart phones or tablets), memory devices, and/or internal networks. As will be described in more detail below, server 16 may be configured to manage access between sender and recipient devices 12, 14, database 18, and/or other resources on network 20.

Figure 3:
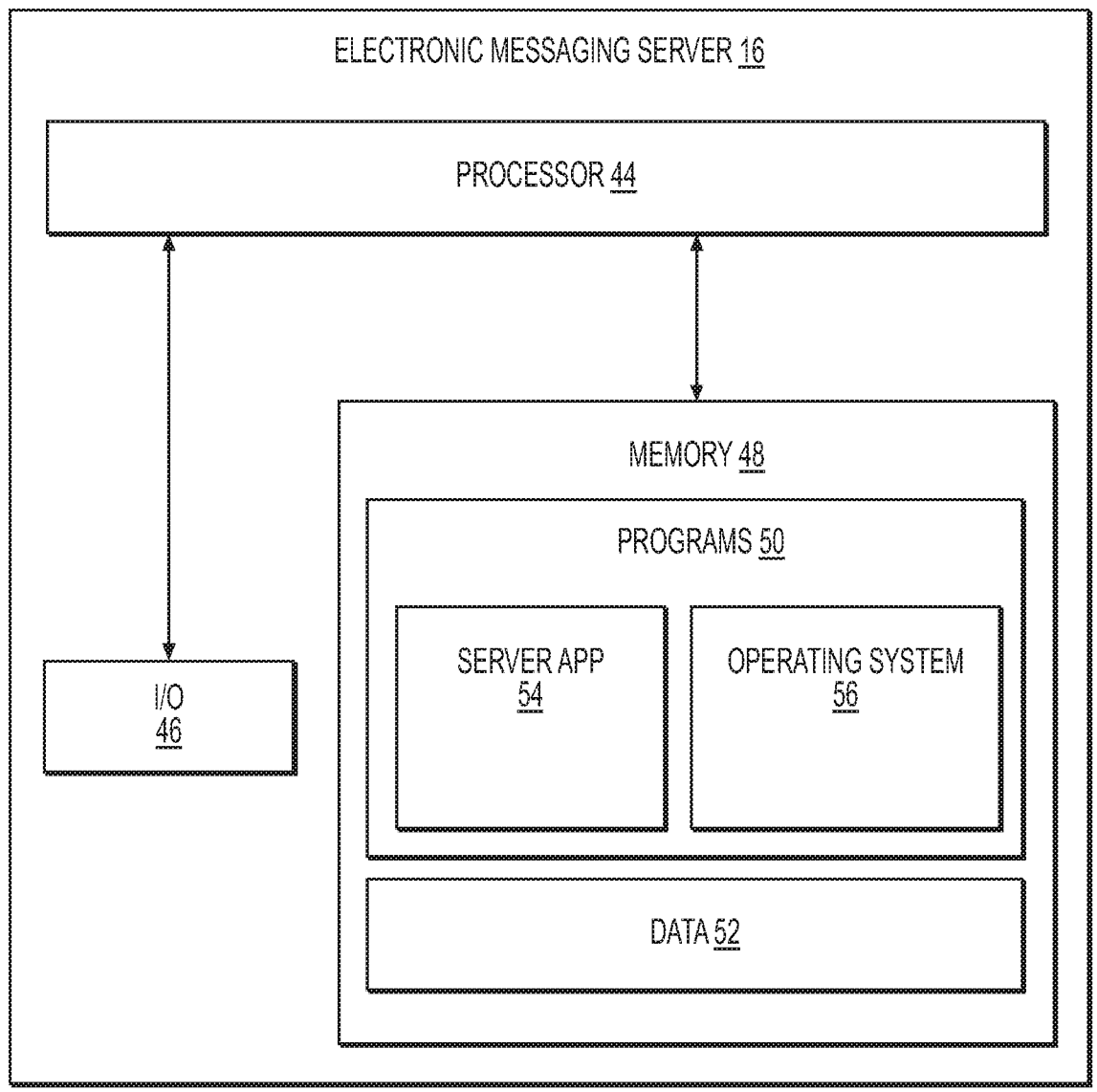
FIG. 3 is a component diagram of an example electronic message device, consistent with the disclosed embodiments.

FIG. 3 shows an example diagram of server 16, consistent with the disclosed embodiments. Server 16 may include one or more processors 44, any number of input/output ("I/O") devices 46, and one or more memories 48 for storing programs 50 and data 52. Programs 50 may include, for example, any number of server apps 54 and an operating system 56.

Processor 44 may include one or more known computing devices that communicate with database 18 (referring to FIG. 1), such as those described with respect to processor 32 shown in FIG. 2. In addition, in some embodiments, processor 44 may include one or more specialized hardware, software, and/or firmware modules (not shown in figure)

specially configured with particular circuitry, instructions, algorithms, and/or data to perform functions of the disclosed methods. It is appreciated that other types of processor arrangements could be implemented that provide for the capabilities disclosed herein.

Memory 48 can be a volatile or non-volatile, magnetic, semiconductor, tape, optical, removable, non-removable, or other type of storage device or tangible and/or non-transitory computer-readable medium that stores one or more executable programs 50, such as a server app 54 and operating system 56. Common forms of non-transitory media include, for example, a flash drive, a flexible disk, a hard disk, a solid state drive, magnetic tape, another magnetic data storage medium, a CD-ROM, another optical data storage medium, any physical medium with patterns of holes, a RAM, a PROM, and EPROM, a FLASH-EPROM, another flash memory, NVRAM, a cache, a register, another memory chip or cartridge, and networked versions of the same.

Memory 48 may store instructions that enable processor 44 to execute one or more applications, such as server app 54, operating system 56, and any other type of application or software known to be available on computer systems. Alternatively or additionally, the instructions, application programs, etc. can be stored in database 18 (referring to FIG. 1) or another internal or external storage (e.g., a cloud storage system) that is in direct communication with server 16, such as one or more databases or memories accessible over network 20. Memory 48 can include one or more memory devices that store data and instructions used to perform one or more features of the disclosed embodiments. Memory 48 can also include any combination of one or more databases controlled by memory controller devices (e.g., servers, etc.) or software, such as document management systems, Microsoft SQL databases, Share Point databases, Oracle™ databases, Sybase™ databases, or other relational databases.

In some embodiments, server 16 is communicatively connected to one or more remote memory devices (e.g., remote databases—not shown) through network 20 or a different network. The remote memory devices can be configured to store information that server 16 can access and/or manage. By way of example, the remote memory devices could be document management systems, Microsoft SQL database, Share Point databases, Oracle™ databases, Sybase™ databases, or other relational databases. Systems and methods consistent with disclosed embodiments, however, are not limited to separate databases or even to the use of a database.

Programs 50 may include one or more software or firmware modules causing processor 44 to perform one or more functions of the disclosed embodiments. Moreover, processor 44 can execute one or more programs located remotely from server 16. For example, server 16 can access one or more remote programs that, when executed, perform functions related to disclosed embodiments. In some embodiments, programs 50 stored in memory 48 and executed by processor 44 can include one or more of server apps 54 and operating system 56.

Server app 54 may cause processor 44 to perform one or more functions of the disclosed methods. For example, server app 54 may cause processor 44 to acquire an electronic message transmitted from sender device 12, determine an attribute of the electronic message; determine an attribute of an intended recipient 24 of the electronic message; receive monitoring data from recipient device 14, from a separate calendaring module 58 (shown only in FIG. 1), from a separate a wearable 60 (shown only in FIG. 1), and/or from another device associated with recipient 24; analyze the monitoring data to determine an availability, temperament, and corresponding receptiveness of recipient 24 for the electronic message; and provide a recommendation (e.g., via the receptiveness indicator) to sender 22 of when the electronic message should be sent to recipient 24. Server app 54 can include additional or fewer functions based on the configuration of system 10. In some embodiments, other components of system 10 are configured to perform one or more functions of the disclosed methods. For example, sender device 12 can determine the attributes of the electronic message (e.g., prior to sending the electronic message to server 16), while recipient device 14 may determine the recipient attributes.

Operating system 56 may perform known operating system functions when executed by one or more processors such as processor 44. By way of example, operating system 56 may include Microsoft Windows™, Unix™, Linux™, Apple™ operating systems, or another type of operating system 56. Accordingly, disclosed embodiments can operate and function with computer systems running any type of operating system 56. Server 16 can also include communication software that, when executed by a processor, provides communications with network 20 (referring to FIG. 1) and/or a direct connection to one or more of sender device 12 and recipient device 14.

In some embodiments, data 52 includes, for example, contact information for sender 22 and recipient 24; temperament history data, sender/recipient relationship data, schedule data, message topic data, etc., and one or more tables, rule sets, algorithms, and/or associative arrays for correlating electronic message attributes and recipient attributes to a receptiveness of recipient 24 (e.g., a likelihood of the electronic message being positively or favorably received by recipient 24).

I/O devices 46 may include one or more interfaces for receiving signals or input from devices and for providing signals or output to one or more devices that allow data to be received and/or transmitted by server 16. For example, server 16 can include interface components for interfacing with one or more input devices, such as one or more keyboards, mouse devices, and the like, which enable server 16 to receive input from an operator or administrator (not shown).

Database 18 (referring to FIG. 1) may include one or more physical or virtual storages in communication with server 16. For example, database 18 can be a volatile or non-volatile, magnetic, semiconductor, tape, optical, removable, non-removable, or other type of storage device or tangible and/or non-transitory computer-readable medium. Database 18 can include one or more memory devices that store data and instructions used to perform one or more features of the disclosed embodiments. Database 18 can also include any combination of one or more databases controlled by a database controller (e.g., a server) or software, such as document management systems, Microsoft SQL databases, Share Point databases, Oracle™ databases, Sybase™ databases, or other relational databases.

In some embodiments, database 18 stores data used in conjunction with the methods disclosed herein, including data generated by sender device 12, recipient device 14, and/or server 16. For example, database 18 can store one or more preferences, limits, thresholds, tables, associative arrays, and/or algorithms for determining the electronic message attributes (e.g., content, context, topic, genre, urgency, etc. of an electronic message) and/or the recipient attributes (e.g., schedule, measured biometrics, message-related history, relationship of the recipient with the sender, etc.).

Network 20 may include any type of computer networking arrangement used to exchange data. For example, network 20 can be the Internet, a private data network, a virtual private network, a satellite link, and/or other connections suitable for use in sending and receiving information between the components of system 10. Network 20 can also include a public switched telephone network ("PSTN") and/or a wireless network (e.g., a cellular network, a Wi-Fi network, or another known wireless network) that is capable of bidirectional data transmission.

In some embodiments, one or more components of system 10 can communicate directly with one another via a direct wired or wireless link. Such embodiments can also include a small-scale wired or wireless network (not shown), such as a short range wireless network including Bluetooth™, Wi-Fi, a Local Area Network (LAN), or a Wireless Local Area Network (WLAN). For example, sender device 12 can communicate with server 16 via short-range Bluetooth™, rather than through a larger-scale connection. It is appreciated that different forms of sender device 12 and recipient device 14 can communicate with server 16 via one or more of the above-described communication schemes, depending on the capabilities of sender device 12, the configuration of recipient device 14, and an availability of network 20 within a vicinity of the respective devices.

Calendaring module 58 may form a part of recipient device 14, a part of server 16, or a part of another component of system that is in communication with the remaining components of system 10 via network 20. For example, calendaring module 58 may embody software embedded within recipient device 14 that manages one or more aspects of the recipient's time. In one embodiment, calendaring module 58 may provide an appointment book, an address book, and/or a contact list as part of a conventional time management software package. The software may be a local package designed for use by only recipient 24 or may be a networked package that allows for the sharing of scheduling information between all users of system 10.

Wearable 60 may be attached to the user, for example, by way of a wristband, a necklace, a headband, a clothing article, etc. Wearable 60 may include at least one temperament-detecting sensor (not shown) and a transmitter (not shown). The temperament-detecting sensor may be configured to generate a signal corresponding to a measured biological parameter of recipient 24 that has been shown to correlate to the temperament of recipient 24. For example, the temperament detecting sensor may be a heart rate sensor, a perspiration sensor, a respiration sensor, and/or a body temperature sensor. It is contemplated that any number and combination of temperament-detecting sensors may be used. The transmitter may be configured to wirelessly broadcast the signals from the temperament sensor of wearable 60 to recipient device 14, for example via Low-Power Bluetooth, for use in combination with the signals generated by sensors 30 that are internal to recipient device 14. It is contemplated, however, that wearable 60 may be omitted in some embodiments, and that sensors 30 of recipient device 14 may perform some or all of the functions of wearable 60. It is also contemplated that, in some embodiments, wearable 60 may additionally or alternatively be communicatively connected to server 16. For example, wearable 60 be coupled to electronic messaging devices 12, 14 and/or server 16 through network 20. In other examples, wearable 60 may be directly coupled to electronic messaging devices 12 and/or 14.

Figure 4:
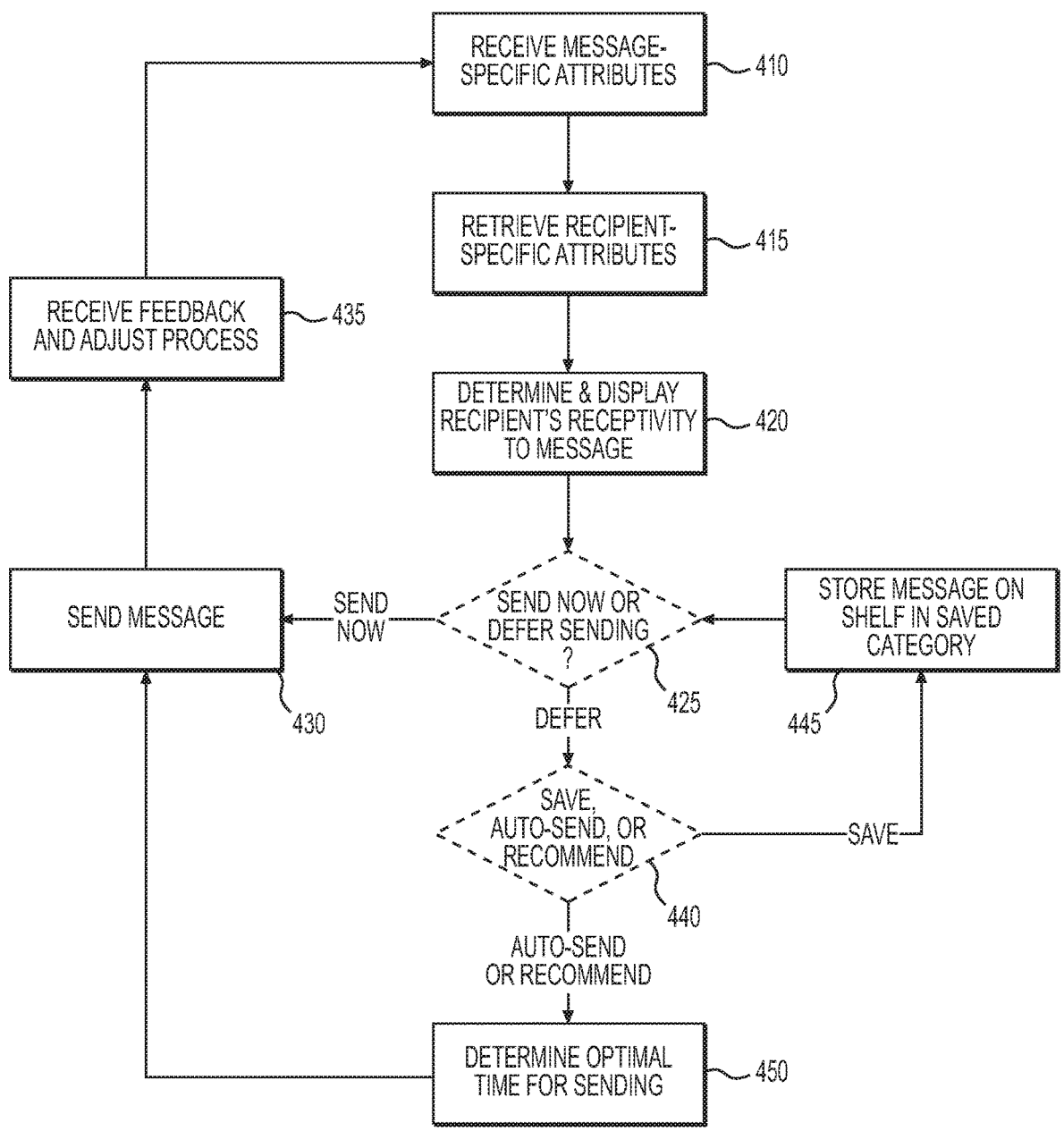
FIG. 4 illustrates a flowchart of an example method for recommending when to send an electronic message, consistent with the disclosed embodiments.

FIG. 4 is a flowchart illustrating an example method 400 for recommending when a particular message from a particular sender 22 should be sent to a particular recipient 24 based on attributes of the particular message and attributes of the particular recipient 24, consistent with the disclosed embodiments. It is appreciated that processor 44 of server 16 (referring to FIG. 3) may be configured to perform method 400. In some embodiments, one or more devices other than server 16 can perform one or more steps of method 400, such as, for example, processor 32 of sender device 12 and/or recipient device 14.

As shown in FIG. 4, method 400 can begin when server 16 receives (and/or deduces) attributes that are specific to a particular message, which sender 22 intends to send to recipient 24 (Step 410). Some or all of the message-specific attributes may be manually entered (e.g., via I/O 28 of sender device 12) into a conventional email format, while some of the attributes may additionally or alternatively be selected via a pull-down window, a button form, a checklist, etc. The message-specific attributes may include, among other things, an identification of recipient 24, as well as the content, context, urgency, genre, temperament, and topic of the message. In other instances, however, the message-specific attributes may be deduced, for example, based on a profile of sender 12 and/or recipient 14, associated skills, field of expertise, etc.; and/or a previous communication for which the attributes have already been determined (e.g., if the new electronic message is a follow-up or continuation discussion).

It is contemplated that some of the message-specific attributes could be automatically determined by system 10, for example based on a predetermined set of rules regarding context and/or content of the electronic message. In particular, server 16 may be configured to determine the attributes of the electronic message by aggregating a plurality of diverse contextual data relating to sender 22, recipient 24, and/or the content of the electronic message generated by sender 22. For the purposes of this disclosure, content may be considered the characters, letters, symbols, numbers, words, and/or phrases in a body, subject line, and/or heading of the electronic message. Accordingly, in one example, server 16 determines the attributes of the electronic message by parsing and/or analyzing the meanings of words, phrases, symbols, and numbers of the electronic message. And based on the results of this parsing and/or analyzing, server 16 may be able to classify the electronic message as a positive message, a negative message, a request, a demand, an inquiry, business related, personal, private, public, time-sensitive, critical, etc.

For example, server 16 may be able to determine that an electronic message is urgent when the electronic message includes the phrase "right away," in close proximity to the terms "respond," "reply," "answer," "decision," etc. In similar manner, server 16 may be able to determine if the electronic message is business related or personal, critical or trivial, good (e.g., positive) news or bad news, etc.

In another example, sender 22 may write the electronic message from a location known by server 16 (e.g., based on data available to server 16 via network 20 or via sender device 12). For instance, sender 22 may write the electronic message from inside of a car on a freeway, and server 16 may be aware (e.g., via an internet news feed) of an incident that has or will bring traffic at that location to a standstill. With the availability of context information from calendaring module 58, wearable 60, and/or sender device 12, server 16 may also be aware that sender 22 is en route to attend a meeting hosted by recipient 24. With some or all of this context information, server 16 may determine that the electronic message to recipient 24 has a relatively high urgency. In similar manner, the content of the electronic message may provide clues indicating that the topic of the message is related to the traffic, the meeting, a schedule abnormality (e.g., that the sender is likely to be late), etc.

In some embodiments, the message-specific attributes may be determined, at least partially, based upon a known (e.g., historic, working, personal, etc.) relationship of a particular sender 22 to a particular recipient 24. For example, server 16 may have access to directory information (e.g., via calendaring module 58 and/or LDAP integration with an organization's Active Directory database). And from this information, server 16 may be configured to determine that recipient 24 is a direct report to sender 22 within the organization.

Similarly, other context information relating to sender 22 and/or recipient 24, can be taken into consideration in order to determine an attribute of the electronic message. For example, information such as a sending or receiving location (for example at a hospital, in the office, or on the beach), biometric information of the sender (e.g., heart rate, respiration rate, perspiration level, motion, pupil dilation, etc., obtained from sender device 12, recipient device 14, and/or wearable 60), or the like may be considered. The message-specific attributes may be intercepted, received, and/or deduced by server 16 before recipient device 14 receives the electronic message.

Server 16 may also be configured to retrieve attributes that are specific to the particular recipient 24 identified in step 410 by sender 22 (Step 420). These attributes may be stored within database 18 and/or provided by recipient device 14, calendar module 58, and/or wearable 60. The recipient-specific attributes may include, among other things, a schedule, current location, activity, available communication media, etc. of recipient 24 (e.g., is recipient 24 at a work station, carrying or actively using recipient device 14, in an important meeting, traveling, on vacation, etc.); a message-related history of recipient 24 (e.g., a history of recipient 24 receiving and responding to messages from sender 22, a history of recipient 24 receiving and responding to messages that are similar to or within a same time-frame of the message received at step 410, etc.); and a current temperament of recipient 24.

The attributes of recipient 24, like the electronic message attributes, may also be automatically determined by server 16 and subsequently stored within database 18. In particular, the attributes of recipient 24 may be automatically determined by aggregating a plurality of diverse contextual data relating to sender 22, recipient 24, and/or the electronic message generated by sender 22. For example, recipient 24 may be at a known location (e.g., a location known based on data available to server 16 via network 20 or recipient device 14) and/or participating in a known activity (e.g., an activity known based on data from wearable 60 to be a meeting, lunch, sleep, exercise, etc.) at a time when sender 22 is drafting the electronic message, and the known location may influence recipient 24 to be more conducive or less conducive to receiving the particular electronic message in a positive manner. For instance, recipient 24 may be at the meeting for which sender 22 is late because of traffic. In this instance, recipient 24 may be very conducive to positively receiving the message from sender 22. In another instance, however, based on biometric information obtained via wearable 60 and/or schedule information obtained via calendar module 58, server 16 may determine that recipient 24 is actively speaking at the meeting and would not be receptive to a negative message.

Server 16 may predict a receptiveness of recipient 24 to the particular message drafted by sender 22, and cause an indication of this receptiveness to be displayed to sender 22 (Step 420). Server 16 may make this prediction using one or more modules, which can be packaged functional hardware units designed for use with other components or a part of a program, such as server app 54, which performs a particular function corresponding to step 420.

The predictive modules of server 16 may be configured to predict the likelihood of positive message receipt by recipient 24 based on training using historical data for the same sender, like senders, the same recipient, like recipients, the same message attributes, like message attributes, etc. The predictive modules may be able to correlate the historic data with new data, and calculate a corresponding confidence value of the correlation. In some embodiments, the modules of server 14 could reliably predict the likelihood of positive message receipt based on the historical training data alone, without considering new data.

The predictive modules of server 16 may compare the message-specific attributes to the recipient-specific attributes (both current and historic) to determine a likelihood of the message being positively or favorably received by recipient 24 now and at other times in the future. Server 16 may then provide an indicator of this receptiveness to sender 22 in the form of a recommendation or a warning (e.g., to send the message now or at another time), in the form of a score (e.g., percentage value that the message will be positively received), in the form of a graphic (e.g., a red light, a yellow light, and a green light), or in another form shown on display 26. For example, when recipient 24 is likely to respond positively to the message from sender 22 (e.g., in a manner desired by sender 22), the score may have a higher value, be illustrated as the green light, provided with a "thumbs up", etc. However, when recipient 24 is likely to respond negatively to the message from sender 22 (e.g., in a manner undesired by sender 22), the score may have a lower value, be illustrated as the red light, provided with a "thumbs down", etc.

Scoring of the receptiveness of recipient 24 may be performed in any manner. In some instances, a score of the receptiveness may be weighted and/or offset by a confidence in the predictability of the score. For example, in some instances, uncertain future events (e.g., the outcome of a sporting event followed by recipient 24, a company earnings report, the health of the recipient, etc.) may have an effect on scoring the receptiveness of recipient 24 to a particular electronic message from sender 22. In these situations, the score may be selectively reduced to account for the uncertainty. In other situations, however, a particular factor having a well-known influence on the temperament of recipient 24 could cause the score to increase. The receptiveness of recipient 24 to a particular message could be represented as a score, a weighted score, a score in association with a confidence value, a score range, a score range with an overlapping confidence curve, a probability distribution, etc.

In some embodiments, server 16 may be configured to recall historic monitoring data for recipient 24, and to identify patterns of monitoring data indicative of recipient 24 being receptive to particular messages (e.g., to messages received at particular times, in particular locations, during particular recipient activities, with particular topics or genres, from particular senders 22, etc.). Server 16 may then analyze current monitoring data to determine whether any of the historic patterns are currently being or will be exhibited. In some embodiments, the patterns may include sequences and/or locations of activities, ambient noise, ambient light, acceleration, deceleration, altitudes, keystroke inputs, locations, schedules, temperament, and any other metrics detected by and/or derived from sensors 30 and/or wearable 60.

In step 420, server 16 may compare monitoring data to one or more thresholds, above which recipient 24 is considered to be "receptive" to the sender's message and below which recipient 24 is consider to be "not receptive." As another example, server 16 may be configured to determine if recipient 24 answered positively to a minimum threshold number of electronic messages within an established time period, to thereby determine that recipient 24 may be "receptive."

It is contemplated that the thresholds used in step 420 could be adjustable by sender 22, if desired. In particular, some messages may require a higher or lower receptiveness from recipient 24. For example, a request by sender 22 for a bonus from recipient 24 may require a high level of receptiveness, while a communication regarding the weather may require a low level of receptiveness or the receptiveness level may not even matter. Accordingly, sender 22 may be provided with a way to selectively adjust the thresholds used at step 420 to accommodate these different situations.

In other embodiments, a temperament of recipient 24 may be more or less conducive to recipient 24 positively receiving the message drafted by sender 22, and server 16 may be configured to predict the temperament and store the predicted temperament within database 18 in connection with the patterns of activity described above. In one embodiment, the temperament of recipient 24 may be predicted based on a past history of recipient 24 and/or a history of recipient 24 receiving messages from sender 22. For example, based on biometric data, calendar data, and/or feedback provided by any component of system 10, server 16 may know that recipient 24 generally has a negative temperament on Monday mornings before 10:00 am. Similarly, based on biometric data and/or feedback provided by sender 22 and/or recipient 24, it may be known that recipient 24 does not like to read decision-related messages on Friday afternoons, at the end of a month, or on the same day as a speaking engagement. In a similar example, server 16 may know that recipient does not positively receive business-related messages after hours, when at home, or during lunch or vacation time. In contrast, following a good quarterly report or after return from a good vacation, recipient 24 may be known by server 16 to react positively toward any type of request or inquiry. This information may be stored by server 16 inside database 18 for future use.

In step 420, server 16 may calculate receptiveness indicator associated with recipient 24 and the message drafted by sender 22, based on the analyses discussed above. In some embodiments, server 16 combines results from different analysis steps and applies additional logic. In some embodiments, server 16 performs a quantitative analysis by scoring the results of the analyses and compares the score to an associative array, thresholds, or rule sets. In other embodiments, server 16 performs a qualitative analysis to determine the receptiveness indicator based on the analyses results.

By way of example only and for purposes of illustrating step 420, server 16 may determine (e.g., based on an analyses of message content) that sender 22 has drafted a business-related email on a Monday morning to a supervisor asking for time-off in the near future (e.g., with less than normal forewarning). These attributes of the message may then be compared by server 16 to the attributes of recipient 24 (i.e., the attributes of the supervisor) to determine what the likelihood is that sender 22 will be granted the requested time off.

The recipient-specific attributes, in this example, may include a schedule of the supervisor showing an important meeting at the current time, and a message-related history showing generally negative responses to emails on Monday mornings. In addition, the recipient-specific attributes of the supervisor may include a current temperament of the supervisor as being the normal negative Monday-morning-temperament (or even more negative than normal.) The recipient-specific attributes may further include knowledge that the supervisor will be returning from vacation on Thursday, and thereafter have lunch with a friend at noon. The recipient-specific attributes may additionally include knowledge that the past three emails responded to by the supervisor received a negative response. Based on the comparison of the message-specific attributes with the recipient-specific attributes in this example, server 16 may calculate values indicative of the sender's email receiving a positive response if sent now and if sent later in the week. And based on these values, server 16 may selectively warn sender 16 that now (i.e., Monday morning) may not be the best time to send the email, and recommend that sending the email instead on Thursday afternoon may produce a greater likelihood of success.

After providing the warning and/or recommendation on display 26 of sender device 12, server 16 may be configured to receive input from sender 22 regarding a desired disposition of the drafted message (Step 425). In particular, in response to the warning and/or recommendation from server 16, sender 22 may indicate (e.g., via I/O devices 28 of sender device 12) a desire to send the message now or to defer sending of the message to a better time in the future. When the input received from sender 22 is indicative of a desire to send the message now (Step 425: Now), server 16 may responsively relay the message to recipient device 14 via network 20 (Step 430).

In some embodiments, after sending of the message at step 430, server 16 may be further configured to receive an update from sender 22 and selectively adjust the process used to make the determination of step 420 (Step 435). In particular, it may be possible for sender 22 to provide a status update to server 16 regarding how well the message was received by recipient 24 (e.g., how successful the message was at providing a desired result). For example, sender 22 may indicate that the requested time-off was granted or denied by the supervisor. Server 16 may then use this information to make adjustments to the process (e.g., to adjust gains, coefficients, tables, schedules, message histories, relationships, etc.) used at step 420, such that future warnings and/or recommendations may be made with greater accuracy.

In some embodiments, database 18 may store a portion or an entirety of a sent electronic message, for use by server 16. For example, server 16 may use this information to improve algorithms or techniques for determining an attribute of an electronic message, for determining an attribute of recipient 24, for monitoring recipient 24, for determining an anticipated receptiveness of recipient 24, and/or for providing the receptiveness indicator to sender 22.

In some embodiments, database 18 may also be used to store data associated with one or more receptiveness indicators. For example, customizable textual message, images, graphics, and/or sounds may be stored within database 18 for providing to sender device 12 after determining an anticipated receptiveness of recipient 24.

Returning to step 425, if sender 22 determines that deferring the sending of the electronic message may better, server 16 may provide sender 22 with several options. In particular, server 16 may determine if sender 22 would prefer that server 16 save the electronic message (e.g., as a draft), auto-send the electronic message, or recommend a time when recipient 24 is more likely to positively receive the electronic message (Step 440).

When sender 22 provides a control instruction to save the electronic message, server 16 may store the message inside of a "saved" category (Step 445). In some instances, the receptiveness indicator may be visible in association with the saved message, such that sender 22 may be able to visually determine when to send the message.

When sender 22 provides a control instruction to auto-send or recommend sending of the electronic message, server 16 may determine (e.g., predict) an optimal time for sending the message (Step 450). Thereafter, server 16 may either automatically send the message when the optimal time arrives or only recommend sending of the message at the optimal time, depending on the control instruction. Control may pass from step 450 to step 430.

FIGS. 5, 6, and 7 illustrate example GUIs 500, 600, and 700, which may be shown on display 26 of sender device 12 (referring to FIG. 2) and that include features corresponding to some of the method steps described above and shown in FIG. 4. As can be seen in FIG. 5, GUI 500 may include options selectable at step 410 by sender 22 in association with the electronic message that sender 22 intends to send to recipient 24. In particular, at step 410, sender 22 may indicate via GUI 500 (e.g., by way of clicking or checking one or more available radio buttons) that the electronic message is business related, urgent, critical, good news, etc. Server 16 may determine, based on the input received via GUI 500 (and other information) some of the attributes of the electronic message that are described above.

Similarly, GUI 600 of FIG. 6 may be used by sender 22 to provide the control instruction received by server 16 at steps 425 and 440. In particular, sender 22 may provide instruction to server 16 to send the electronic message now, to save the electronic message for later (e.g., for a time when sender 22 instructs server 16 to send the electronic message), to auto-send the electronic message at a more opportune time (e.g., when the receptiveness indicator is higher or exceeds a user-defined threshold value), or to recommend when to send the electronic message (e.g., based on the value of the receptiveness indicator).

GUI 700 may be used after the electronic message has been sent by server 16 to provide feedback regarding how well the electronic message was received by recipient 24. In particular, at step 435 described above, sender 22 may be able to indicate, for example, if the outcome was positive or if the sending time was early or late.

Figure 8:
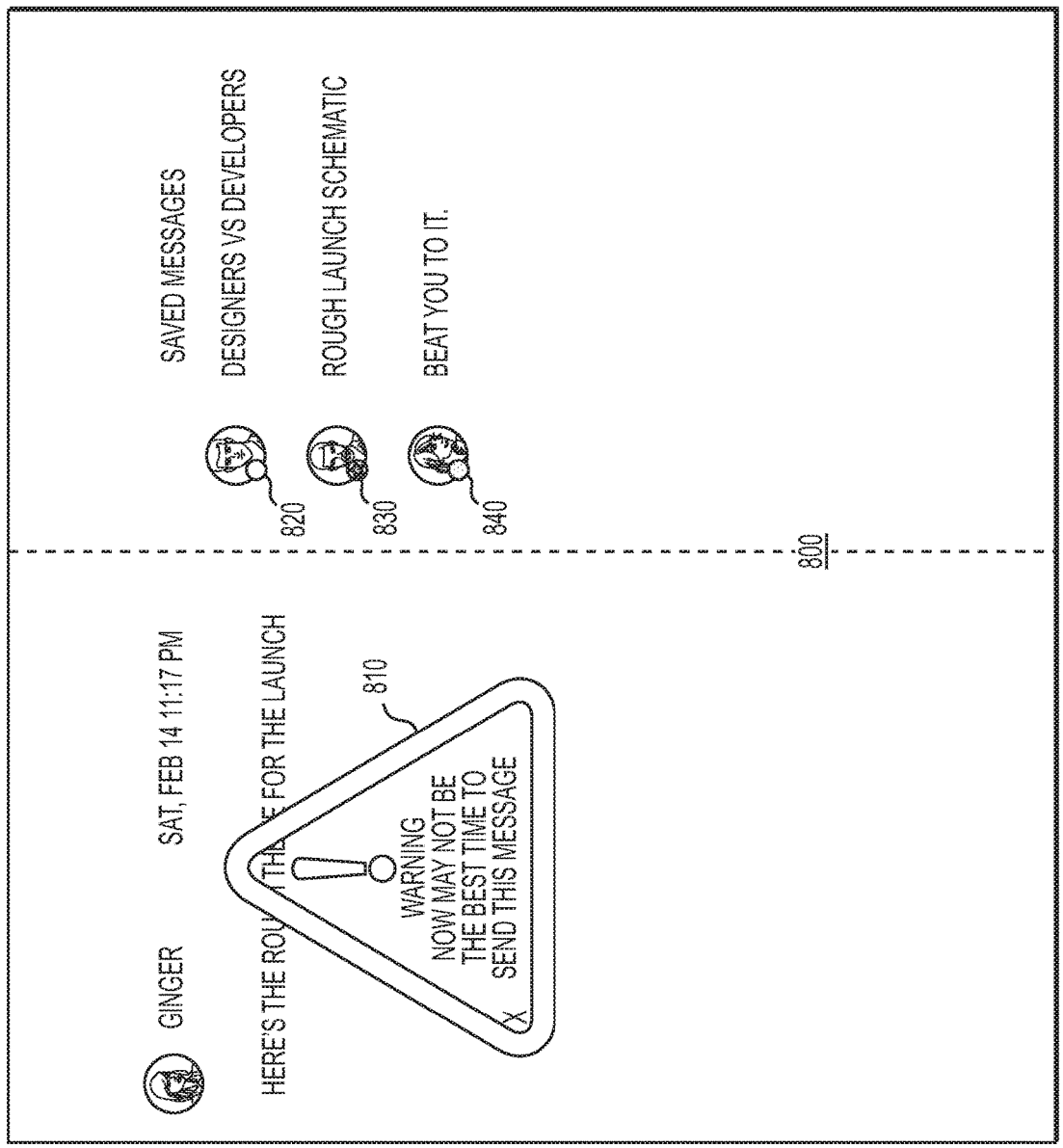

FIG. 8 illustrates an example GUI 800, which may also be shown on display 26 of sender device 12 (referring to FIG. 2) and that also includes features corresponding to some of the method steps described above and shown in FIG. 4. GUI 800 may represent the main screen available to sender 22 during message drafting. As shown at a left of GUI 800, a first receptiveness indicator 810 may be displayed as a warning overlaid on a top portion of the electronic message. This warning may alert sender 22 that the current recipient-specific attributes may not correspond with a positive reception of the electronic message. By overlaying the warning on the message, sender 22 may be immediately alerted of the situation, allowing sender 22 to take prompt action (e.g., to abort the drafting, to save the draft, etc.) rather than wait for completion of the message draft. Additional receptiveness indicators 820, 830, and 840 may be shown as a red light, a yellow light, and a green light, respectively, in association with previously drafted and saved message on a virtual shelf located to the right of GUI 800. These indicators may allow sender 22 to visually see when the messages should be sent (e.g., when the green light indicator 840 is present).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as non-limiting, with a true scope and spirit being indicated by the following claims and their full scope of equivalents.

What is claimed is:

1. A method for determining when to send an electronic message, the method comprising:

receiving, by a server, historical attribute data from a sender and from a recipient;

populating a database with the received historical attribute data;

receiving, by the server, the electronic message from the sender and for the recipient;

measuring a biometric of the recipient;

determining, by a predictive module, the temperament of the recipient based on the biometric;

predicting, by the predictive module, a receptiveness indicator for the recipient to reading the electronic message based on an attribute of the electronic message, an additional attribute of the recipient comprising at least the temperament of the recipient, and the received historical attribute data, wherein the receptiveness indicator is a colored graphic shown in association with the electronic message;

displaying the receptiveness indicator to a sender of the electronic message;

displaying control instruction options based on the received historical attribute data from the sender, the control instruction options including at least a first control instruction option to send the electronic message immediately and a second control instruction option to defer sending the electronic message;

receiving, by the server, a selection of one of the first or the second control instruction options from the sender selectively sending the electronic message from the server to the recipient, based on the selection, the preference information of the sender, and the receptiveness indicator; and updating the database with the receptiveness indicator and the received control instruction.

2. The method of claim 1, wherein, when the selection includes the second control instruction option to defer sending of the electronic message, the method further includes selectively saving the electronic message, auto-sending the electronic message when the receptiveness indicator is higher, or recommending sending of the electronic message when the receptiveness indicator is higher.

3. The method of claim 1, further including showing the receptiveness indicator laid over a draft of the electronic message while the sender is drafting the electronic message.

4. The method of claim 3, wherein the receptiveness indicator is a warning to not send the electronic message now.

5. The method of claim 1, wherein the attribute of the electronic message includes at least one of a content, a context, a topic, a genre, an urgency, and a temperament.

6. The method of claim 1, wherein the additional attribute of the electronic message further includes at least one of a schedule, a message-related history, and a relationship with the sender.

7. The method of claim 1, wherein determining the temperament of the recipient further includes determining the temperament of the recipient based on a historic pattern of temperaments.

8. A non-transitory computer-readable medium storing instructions that are executable by at least one processor of a device of a sender to cause the device to perform a method for determining when to send an electronic message, the method comprising:

receiving historical attribute data from the sender and from a recipient;

populating a database with the received historical attribute data;

receiving the electronic message from the sender and for the recipient;

measuring a biometric of the recipient;

determining, by a predictive module, the temperament of the recipient based on the biometric;

predicting, by the predictive module, a receptiveness indicator for the recipient to reading the electronic message based on an attribute of the electronic message, an additional attribute of the recipient comprising at least the temperament of the recipient, and the received historical attribute data, wherein the receptiveness indicator is a colored graphic shown in association with the electronic message;

displaying the receptiveness indicator to a sender of the electronic message;

displaying control instruction options based on the received historical attribute data from the sender, the control instruction options including at least a first control instruction option to send the electronic message immediately and a second control instruction option to defer sending the electronic message;

receiving, by the server, a selection of one of the first or the second control instruction options from the sender;

selectively sending the electronic message from the server to the recipient, based on the selection, the preference information of the sender, and the receptiveness indicator; and updating the database with the receptiveness indicator and the received control instruction.

9. The non-transitory computer-readable medium of claim 8, wherein, when the selection includes the second control instruction option to defer sending of the electronic message, the method further includes selectively saving the electronic message, auto-sending the electronic message when the receptiveness indicator is higher, or recommending sending of the electronic message when the receptiveness indicator is higher.

10. The non-transitory computer-readable medium of claim 8, wherein the method further includes displaying the receptiveness indicator laid over a draft of the electronic message while the sender is drafting the electronic message.

11. The non-transitory computer-readable medium of claim 8, wherein:

the attribute of the electronic message includes at least one of a content, a context, a topic, a genre, an urgency, and a temperament; and the additional attribute of the recipient further includes at least one of a schedule, a message-related history, and a relationship with the sender.

12. A system for determining when to send an electronic message, the system comprising:

a memory having stored thereon computer-executable instructions; and one or more processors configured to execute the stored instructions to:

receive historical attribute data from a sender and from a recipient;

populate a database with the received historical attribute data;

receive an electronic message from the sender;

measuring a biometric of the recipient;

determining, by a predictive module, the temperament of the recipient based on the biometric;

determine a receptiveness indicator, with the predictive module, based on an attribute of the electronic message, an additional attribute of the recipient comprising at least the temperament of the recipient, and the received historical attribute data, wherein the receptiveness indicator is a colored graphic shown in association with the electronic message;

display the receptiveness indicator to the sender;

display control instruction options based on the received historical attribute data from the sender, the control instruction options including at least a first control instruction option to send the electronic message immediately and a second control instruction option to defer sending the electronic message;

receive a selection of one of the first or the second control instruction options from the sender;

selectively send, save, auto-send, or recommend sending of the electronic message, from the system to a recipient, based on the receptiveness indicator and the selection, wherein:

the attribute of the electronic message includes at least one of a content, a context, a topic, a genre, an urgency, and a temperament; and the attribute of the recipient includes at least one of a schedule, a temperament, a message-related history, and a relationship with the sender; and update the database with the receptiveness indicator and the received control instruction.

13. The method of claim 1 further including:

displaying, to the sender, a feedback indication regarding how the message was received by the recipient.

\* \* \* \* \*